United States Patent [19]

Poleschuk et al.

[11] Patent Number: 4,683,521
[45] Date of Patent: Jul. 28, 1987

[54] UNDER HOOD AND LUGGAGE COMPARTMENT LAMP ASSEMBLY

[75] Inventors: Nicholas A. Poleschuk, Farmington; LeRoy A. Poleschuk, Warren, both of Mich.

[73] Assignee: Beta Manufacturing Corp., Warren, Mich.

[21] Appl. No.: 837,300

[22] Filed: Mar. 7, 1986

[51] Int. Cl.$^4$ .................. F21V 21/00; F21V 23/04
[52] U.S. Cl. ........................... 362/80; 362/295; 362/311; 362/394; 362/439; 362/802; 200/184; 439/556; 439/602; 439/699
[58] Field of Search ............... 362/802, 154, 155, 276, 362/295, 311, 394, 437, 439, 448, 382, 80; 200/184, 61.47; 339/119 L, 125 L, 154 L, 206 L

[56] References Cited

U.S. PATENT DOCUMENTS

| | | | |
|---|---|---|---|
| 2,206,094 | 7/1940 | Hobbs | 362/394 |
| 2,289,027 | 7/1942 | Lyle | 362/394 |
| 2,570,751 | 10/1951 | Benander | 339/119 L |
| 2,705,750 | 4/1955 | Farnon | 362/802 |
| 4,316,239 | 2/1982 | Cass et al. | 362/80 |
| 4,554,618 | 11/1985 | Bafunno et al. | 362/155 |

Primary Examiner—Andrew M. Dolinar
Attorney, Agent, or Firm—Barnes, Kisselle, Raisch, Choate, Whittemore & Hulbert

[57] ABSTRACT

An under hood and luggage compartment lamp assembly which is adapted to be positioned on a hood or luggage compartment of a vehicle. The lamp assembly comprises a plastic body which has, at one end, a first set of spaced terminals the outer ends of which extend parallel for connection to a plug of a wiring harness and at the other end of a second set of spaced terminals, the outer ends of which are shaped for receiving a wedge based lamp. The inner end of the other of the first set of terminals is bent and resiliently engages the spherical contact of a mercury switch and the inner end of one of the second set of terminals is bent and engages the button contact of the mercury switch. The inner end of the first set of terminals directly engages the inner end of the other of the second set of terminals. The body is provided with projections and recesses for locating the terminals such that they can be dropped in place during assembly. A cover closes the body and mechanically locked to the body. The body further includes a first connector mounted thereon for snap engagement with an opening in the foot or luggage cover onto which it is mounted. The body further includes a second connector which is adapted to snap into a second opening but is manually disengageable therefrom as may be needed. In a modified form, the mercury switch is eliminated and the terminals that engage the mercury switch are formed straight and interconnected directly.

20 Claims, 20 Drawing Figures

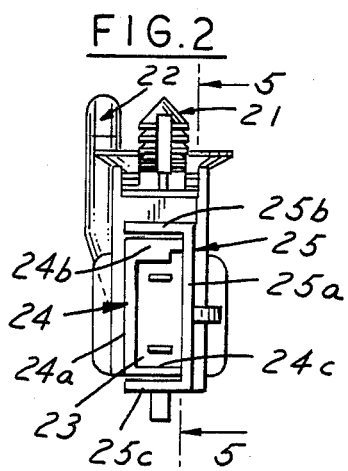
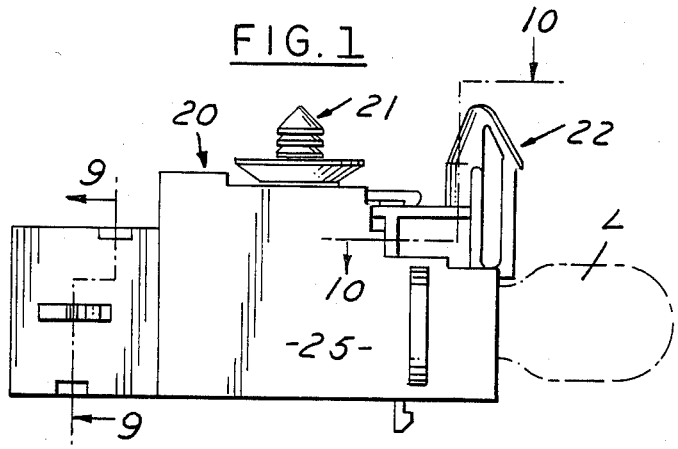
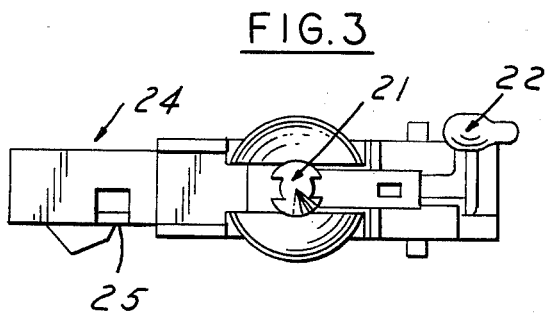
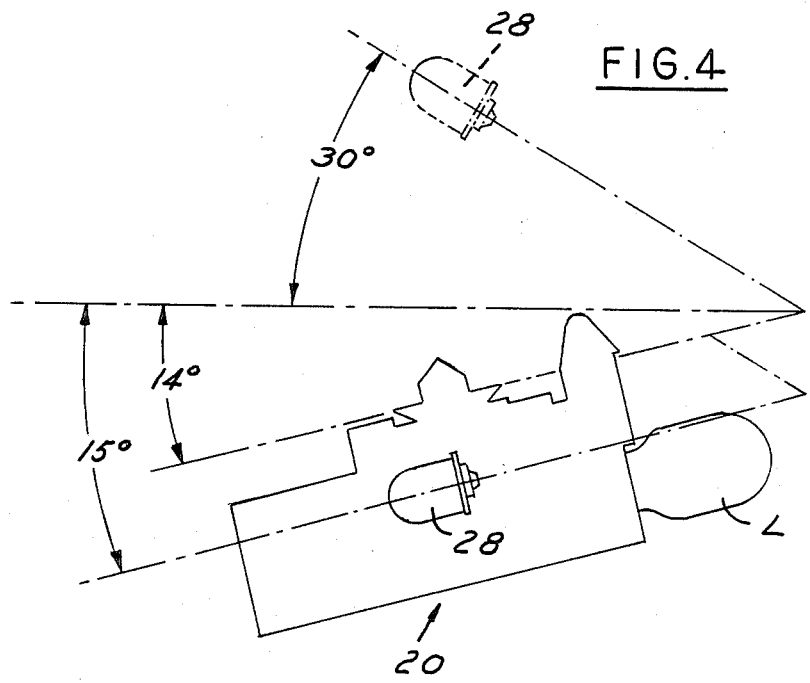

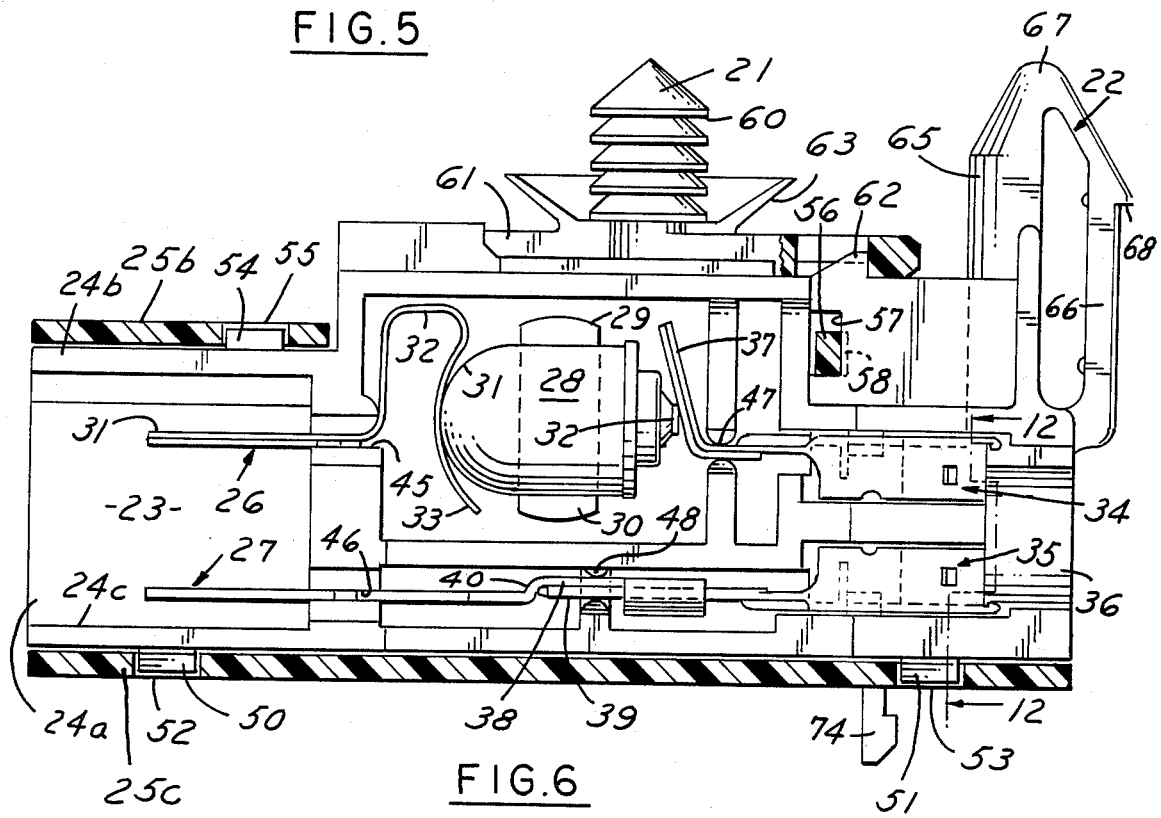
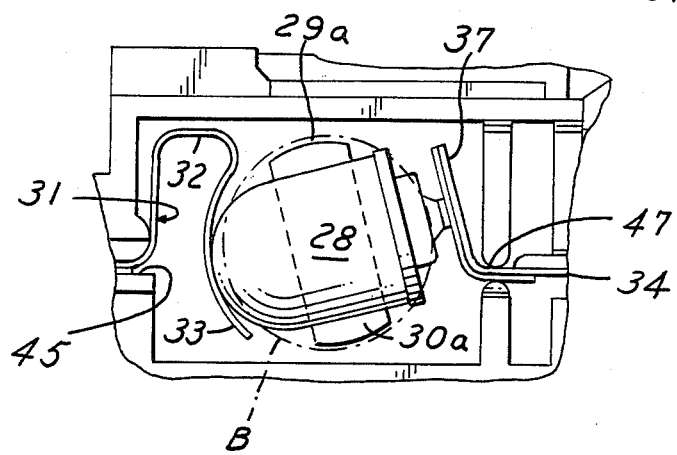
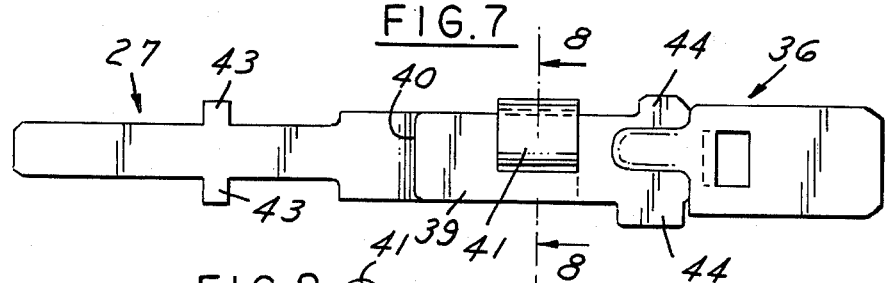
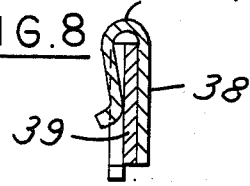

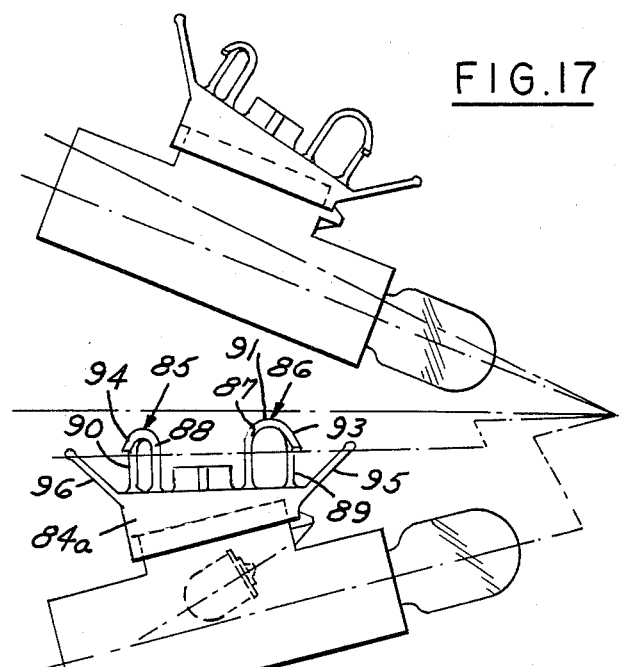
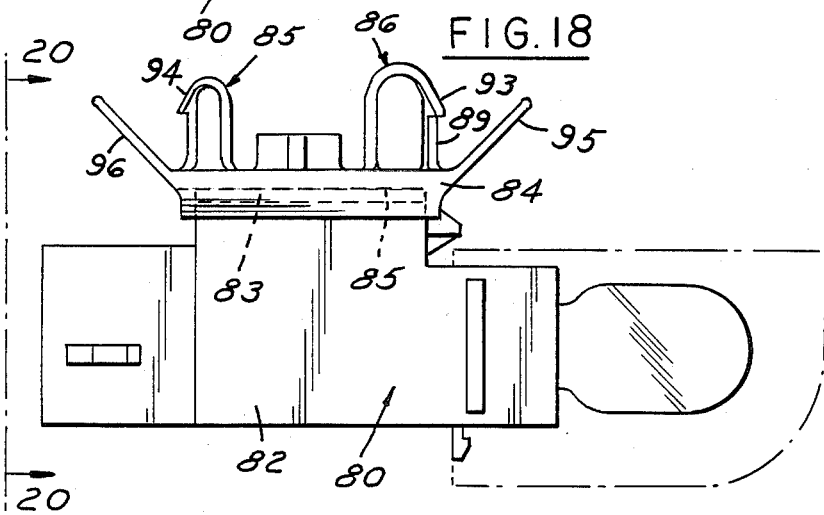
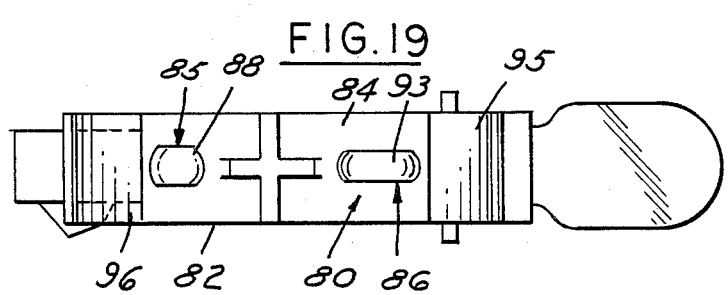
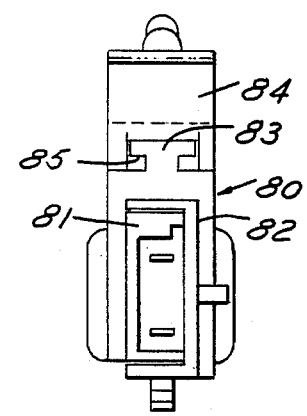

4,683,521

UNDER HOOD AND LUGGAGE COMPARTMENT LAMP ASSEMBLY

This invention relates to lamp assemblies such as are mounted on a hood or cover of a luggage compartment to energize a lamp when the hood or cover is opened or lifted.

BACKGROUND AND SUMMARY OF THE INVENTION

In automobile vehicles and the like, it is common to provide a lamp assembly under the hood or luggage compartment cover to energize a lamp when the hood or cover is lifted. In one common device, a mercury switch is positioned in a plastic body and one set of terminals is provided therein which extend to a position for receiving a wedge base lamp. In order to contact the mercury switch, additional resilient spring loaded contacts extend from this set of terminals. Similarly, additional contacts are provided for at other ends of the mercury switch with associated intermediate contacting means to the mercury switch and wires extend from these contacts to the exterior of the body.

Among the objectives of the present invention are to provide a lamp assembly which effectively provides the desired illumination, which eliminates parts between the external contacts and the mercury switch; which minimizes the number of parts; wherein the terminals can be readily dropped in place during assembly; which has a novel mechanism for mounting the lamp assembly in position; which is capable of being disconnected manually; which can be very readily adapted to use without a mercury switch; which includes a novel lens arrangement; and which includes novel means for precisely providing the desired mounting of the lamp assembly on the hood or luggage compartment cover of the vehicle.

In accordance with the invention, an under hood and luggage compartment lamp assembly which is adapted to be positioned on a hood or luggage compartment of a vehicle so that when the hood or cover is lifted the lamp is energized comprises a plastic body, which has, at one end, a first set of spaced terminals, the outer end of which extend parallel for connection to a plug of a wiring harness and at the other end a second set of spaced terminals for receiving a wedge based lamp. The inner end of one of the first set of terminals is bent and resiliently engages the spherical contact of a mercury switch and the inner end of one of the second set of terminals is bent and engages the button contact of the mercury switch. The inner end of the other of the first set of terminals directly engages the inner end of the other of the second set of terminals. The body is provided with projections and recesses for locating the terminals such that they can be dropped in place during assembly. A cover closes the body and is mechanically locked to the body. The body further includes a first connector mounted thereon for snap engagement with an aligned opening in the foot or luggage cover onto which it is mounted. The body further includes a second connector which is adapted to snap into a second locating opening but is manually disengageable therefrom as may be needed. In a modified form, the mercury switch is eliminated and the terminals that engage the mercury switch are formed straight and interconnected directly.

DESCRIPTION OF THE DRAWINGS

FIG. 1 is an elevational view of the lamp assembly embodying the invention.

FIG. 2 is an end view taken from the left end of the lamp assembly shown in FIG. 1.

FIG. 3 is a plan view of the lamp assembly.

FIG. 4 is a diagrammatic view showing the manner in which the lamp assembly functions as the hood or luggage compartment cover is opened FIG. 5 is a sectional view on an enlarged scale taken along the line 5—5 in FIG. 2.

FIG. 6 is a fragmentary view of a modified form of the lamp assembly.

FIG. 7 is a plan view on an enlarged scale of one pair of interconnected terminals.

FIG. 8 is a sectional view taken along the line 8—8 in FIG. 7.

FIG. 17 is a diagrammatic view showing the manner in which a modified form of lamp assembly functions as the hood or luggage compartment cover is opened.

FIG. 18 is an elevational view of another modified form of lamp assembly.

FIG. 19 is a plan view of the assembly shown in FIG. 18.

FIG. 20 is a view taken along the line 20—20 in FIG. 18.

DESCRIPTION

Figure 9:
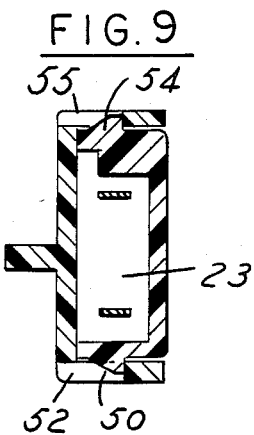
FIG. 9 is a sectional view taken along the line 9—9 in FIG. 1.
Figure 10:
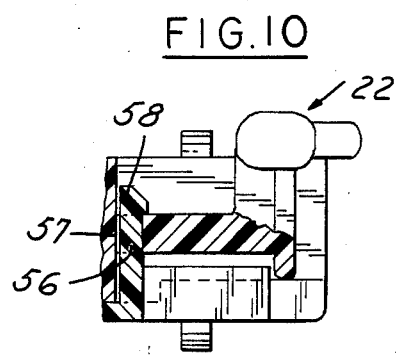
FIG. 10 is a sectional view taken along the line 10—10 in FIG. 1.
Figure 11:
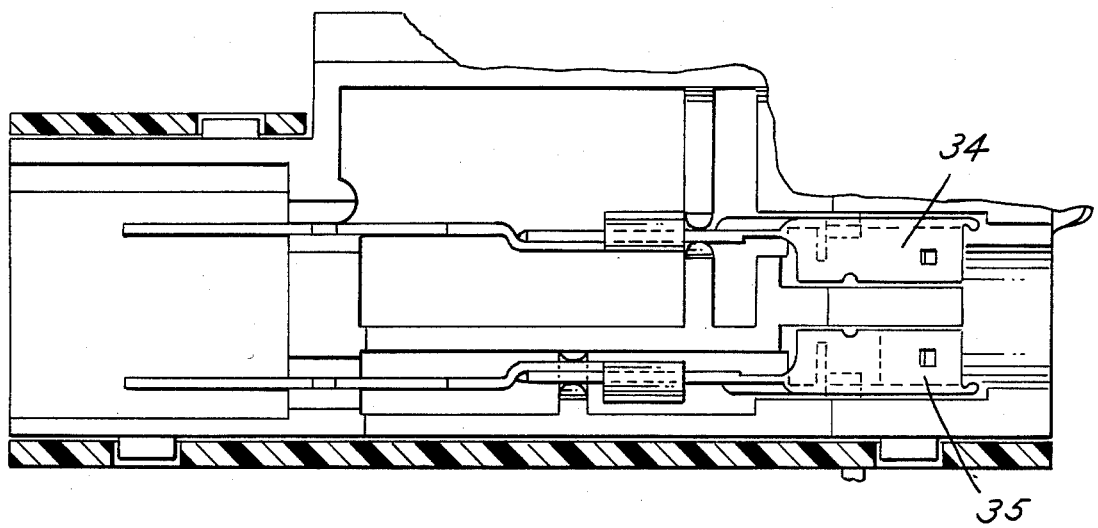
FIG. 11 is a sectional view of a modified form lamp assembly.

Referring to FIG. 1 the lamp assembly embodying the invention comprises a housing 20 that supports a lamp L with a wedge base. The lamp assembly is adapted to be mounted in spaced openings on the underside of a hood or luggage compartmemt lid or cover by a first locator and connector or snap-in connector 21 and a second integral locator or snap-in connector 22. The lamp assembly further includes an end that is open as at 23 for receiving a plug to make an electrical connection through a harness (not shown).

Referring to FIG. 4, the lamp assembly includes a mercury switch 28 which is operable as the part with which it is associated is elevated to energize the lamp L as shown diagrammatically wherein the switch is shown as moving through an arc that causes the mercury switch to change its orientation and thereby energize the lamp L.

The housing 20 includes a body 24 and a cover 25 that is telescoped over the body 24 and mechanically interengaged with the body 24 to close the body 24. The body 24 and cover 25 are generally U-shaped and comprise a base wall 24a, 25a and spaced walls 24b, 24c, 25b, 25c. The walls 25b telescope over the walls 24b. The body 24 and cover are made of dimensionally stable plastic such as nylon.

Referring to FIG. 5, the body 25 supports and positions a first set of electrical contacts 26, 27 which extend in the previously identified cavity 23 to the exterior at one end of the body 25. The mercury switch 28 is positioned within the body 25 by integral projections 29, 30 and includes a spherical contact 31 and a button contact 32. The terminal 26 includes a folded over stronger portion 31 and a bent portion 32 the free end of which is curved as at 33 to provide a concave surface which engages the spherical end of the mercury switch 28. The other terminal 27 of the first set of terminals is substantially straight throughout its length.

Figure 13:
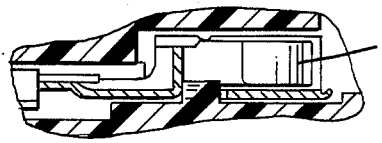
FIG. 13 is a fragmentary sectional view taken along the line 13—13 in FIG. 12.
Figure 12:
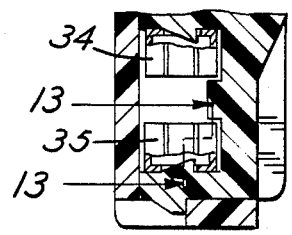
FIG. 12 is a sectional view taken along the line 12—12 in FIG. 5.

Body 25 further supports a second set of electrical terminals 34, 35 which extend toward a cavity or opening 36 at the opposite end of the housing. Referring to FIGS. 12 and 13 the outer ends of the terminals 34, 35 are bent to provide spaced and facing convex electrical contacting surfaces, formed in a manner well known in the art, to receive the wedge base of the lamp L and control the contacting surfaces.

The inner end 37 of terminal 34 is folded over itself and bent at an acute angle for resiliently engaging the button contact 32 of the mercury switch 28. Terminal 35 is substantially straight and engages the inner end 38 of terminal 27 in planar fashion with the end 39 of terminal 35 abutting a bend 40 intermediate the ends of terminal 27. Terminal 27 further includes an integral lateral wing 41 that is bent over and engages the opposite side of the end 39 of terminal 35 as shown in FIGS. 7 and 8.

Each of the terminals 2, 6, 27 and 34, 35 has laterally extending wings 43, 44 that engage recesses molded in the body 24 and associated cover 25 for locating and holding the terminals in position. In addition, the body 24 is provided with slots 45, 46, 47 and 48 for guiding and holding the terminals. By such an arrangement, the terminals can be dropped in place in the body 24 and the cover 25 applied to securely hold the terminals in position. Means are provided for mechanically interengaging the body 24 and cover 25 to form the housing and comprise spaced triangular shaped projections 50, 51, each which defines a tooth or hook, on the wall 24c of the body 24 that project through the openings 52, 53 adjacent wall 25c of the cover 25 and snap over and engage the ends of the openings 52, 53. The interengaging means further comprise a similar projection 54 generally opposite projection 50 on the wall 24b of the body 24 which projects through and snaps over and engages the edge of opening 55 in the wall 25b of the cover. The interengaging means further includes a longer projection 56 on the base wall 25a of the cover 25 that projects through an opening 57 in the base wall 24a of the body 24. The end 58 of the projection 56 is triangular such that it snaps over the edge of the opening 57. The cover 25 is provided with laterally extending tabs 50, 51 that snap over projections 52, 53 to lock the cover in position.

Connector 21 comprises a series of serrations 60 molded on a base member 61 that is held in position by engagement with a projection 62 on the housing. The body 24 and cover 25 which form the housing further include a resilient integral lip 63 so that it engages one side of the plate or base through which the connector 62 extends to seal the opening. The second retaining connector 22 comprises a first rigid portion 65 extending parallel to the axis of the projection 21, a second resilient portion 66 joined to the portion 65 by a pointed or tapered integral portion 67. A lateral projection 68 is provided on the portion 66. The projection 22 is adapted to snap into an elongated opening in the wall of the hood or luggage compartment cover. The portion 66 can be manually depressed toward the portion 65 to disengage the projection 22 as may be required.

In the modified form shown in FIG. 6, the projections 29a, 30a which locate the mercury switch 28 are positioned at an angle to accommodate an operating condition which is different in angle from that of the form shown in FIG. 5. This can be readily achieved by having a removable mold insert that is replaced in the overall mold to have the projections 29a, 30a at an angle rather than vertically disposed as in FIG. 5. The use of different inserts is represented by the broken line B representing the edge of the insert as it would leave an impression during injection molding.

Figure 14:
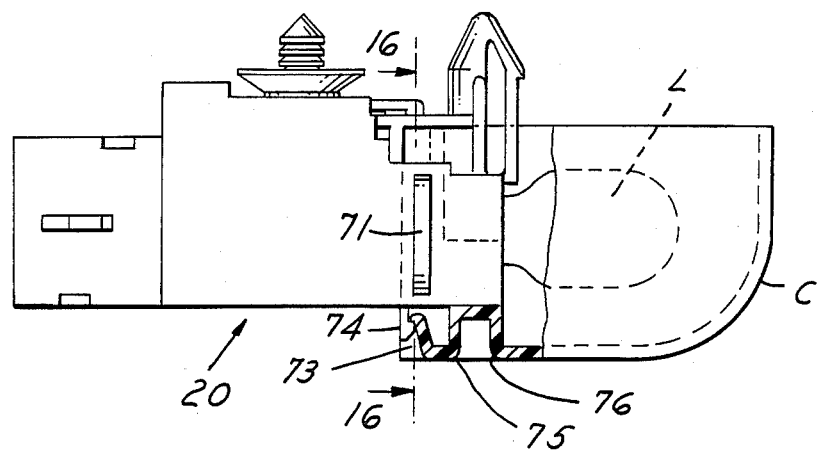
FIG. 14 is a view similar to FIG. 1 showing a lamp cover on the switch partly in section.
Figure 15:
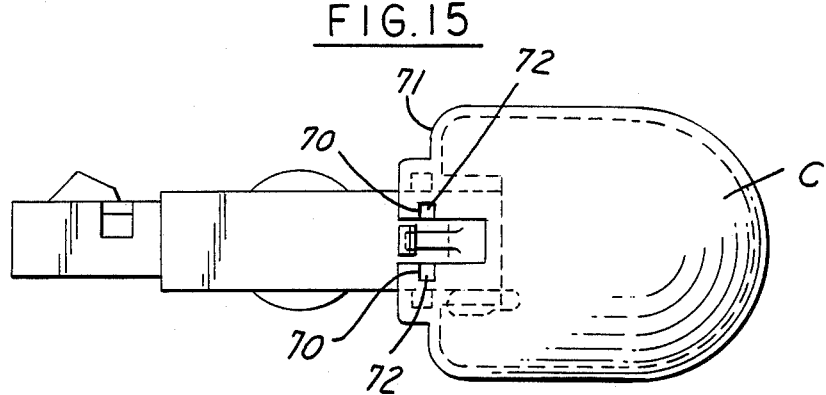
FIG. 15 is a bottom plan view of the same.
Figure 16:
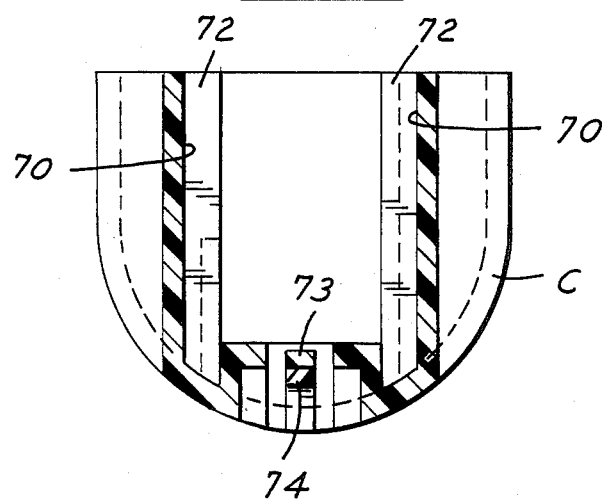
FIG. 16 is a sectional view taken along the line 16—16 in FIG. 14.

Referring to FIGS. 14–16, the housing is adapted to receive a lens C of semi-translucent plastic material such as polycarbonate to protect the lens and provide diffused light. As such, the lens C is shaped in the form of an opened ended shade where the open side faces the hood or luggage compartment switch. In accordance with the invention, the lens C is formed with integral grooves 70 in the end walls 71 of the lens which slidingly engage ribs 71 on the walls 24a, 25b of the body 24 and cover 25.

In order to hold the lens C in position, a yieldingly extending tab having a tooth end 73 is adapted to latch with a hook 74 on the body 25 of the lamp. The tab 73 is yieldingly provided by being one arm of a U-shaped portion 75 that extends axially outwardly and is joined as at 76 to the lens C.

It can thus be seen that there has been provided a lamp assembly which effectively provides the desired illumination, which eliminates parts between the external contacts and the mercury switch; which minimizes the number of parts; wherein the terminals can be readily dropped in place during assembly; which has a novel mechanism for mounting the lamp assembly in position which is capable of being disconnected manually; which can be very readily adapted to use without a mercury switch; which includes a novel lens arrangement; and which includes novel means for precisely providing the desired mounting of the lamp assembly on the hood or luggage compartment cover of the vehicle.

In the forms of the invention shown in FIGS. 17–20 the lamp assembly is the same but an adapter element is provided to adjust the angular relationship of the lamp assembly to the hood or luggage compartment cover to which it is attached. In this manner the same lamp assembly can be used for various designs of automobiles having hoods or luggage compartment covers that open greater or lesser distances.

The lamp assembly 80 includes a housing comprising a body 81 and a cover 82 with internal construction as in the previous forms above described. The top wall of the body 81 is formed with a T shaped element 83 extending longitudinally on which an adapter 84 is mounted by slidingly engaging the T shaped slot 85 in the underside of the adapter with the projection 83. In one form as shown in FIGS. 18, 19 and 20 the adapter 84 is of uniform thickness throughout and functions to space the lamp the correct distance from the hood or cover to which it is attached. In the form shown in FIG. 17, the adapter 84A has an upper surface which is at an inclined angle to the lower surface thereof and functions to change the angular relationship of the lamp assembly 80 to the hood or cover.

Each of the adapters 84, 84a includes spaced integral locators or snap-in connectors 85, 86 which are similar to the connectors 22 therefore described and are adapted to snap into openings in the hood or cover. Each conector 85, 86 includes a rigid portion 87, 88 and a parallel resilient portion 89, 90 connected to the rigid portion by connecting portion 91, 92. In addition, each includes a lateral projection 93, 94 as in the case of the projection 22. Each adapter 84, 84a includes resilient wings or fingers 95, 96 which engage the hood or cover and urge the adapter and in turn the lamp assembly outwardly relative thereto.

We claim:

1. An under hood and luggage compartment lamp assembly which is adapted to be positioned on a hood or luggage compartment of a vehicle comprising
   a plastic body having at one end, a first set of spaced terminals the outer end of which extend parallel for connection to a plug of a wiring harness and at the other end a second set of spaced terminals the outer end of which are shaped for receiving a wedge based lamp,
   a mercury switch in said body having a spherical contact and a button contact,
   the inner end of one of the first set of terminals being bent and resiliently engaging the spherical contact of said mercury switch and the inner end of one of the second set of terminals being bent to engage the button contact of the mercury switch,
   the inner end of the other of the first set of terminals directly engaging the inner end of the other of the second set of terminals
   the body being provided with projections and recesses for locating the terminals and mercury switch such that they can be dropped in place during assembly,
   a cover closing said body.

2. The lamp assembly set forth in claim 1 wherein said body further includes a first connector mounted thereon for snap engagement with a first locating opening in the hood or luggage cover onto which it is mounted,
   said body further including a second connector mounted thereon which is adapted to snap into a second locating opening, said second connector being manually disengageable therefrom as may be needed.

3. The lamp assembly set forth in claim 2 wherein said connectors are mounted on an adapter, and means removably interegaging said adapter and said body.

4. The lamp assembly set forth in claim 1 wherein said body includes integral means therein for receiving and holding the terminals in position.

5. The lamp assembly set forth in claim 4 wherein said means includes recesses, said terminals having projections extending into said recesses.

6. The lamp assembly set forth in claim 5 wherein said means includes slots in said body into which said terminals extend.

7. The lamp assembly set forth in claim 1 wherein said inner end of one terminal of said first set which engages said spherical contact of said mercury switch has an arcuate contacting surface engaging said mercury switch.

8. The lamp assembly set forth in claim 7 wherein the inner end of said one terminal of said second set of terminals engages said button contact of said mercury switch is folded upon itself.

9. The lamp assembly set forth in claim 1 wherein said inner end of other terminal of said first set of terminals and said inner end of said other terminal of said second set of terminals are interconnected by a bent portion of one of said terminals which engages the other of said terminals.

10. The lamp assembly set forth in claim 1 wherein said body includes a connector extending laterally therefrom comprising a first rigid portion and a second portion spaced from the first portion and joined thereto and having a hook portion for engaging the connector with an elongated opening, said second portion being flexible such that it can be manually moved toward said first portion to disengage said hook means on said second portion.

11. The lamp assembly set forth in claim 10 wherein said connector is mounted on an adapter, and means removably interengaging said adapter and said body.

12. The lamp assembly set forth in claim 11 including resilient wings on said adapter adapted to engage the hood or luggage compartment cover to urge the adapter and, in turn, the lamp assembly outwardly relative to the hood or luggage compartment cover.

13. The lamp assembly set forth in claim 11 wherein said interengaging means comprises a longitudinally extending projection on one of said body and said adapter and a complementary longitudinally extending slot on the other of said body and adapter such that they are slidably interengaged.

14. The lamp assembly set forth in claim 13 including resilient wings on said adapter adapted to engage the hood or luggage compartment cover to urge the adapter and, in turn, the lamp assembly outwardly relative to the hood or luggage compartment cover.

15. The lamp assembly set forth in claim 14 wherein said interengaging means comprises a longitudinally extending projection on one of said body and said adapter and a complementary longitudinally extending slot on the other of said body and adapter such that they are slidably interengaged.

16. The lamp assembly set forth in claim 1 including a lens of translucent plastic material, said body and cover having opposed spaced ribs, said lens having grooves slidingly engaging said ribs, said lens having an integral latch engaging a portion of said housing for retaining said lens in position.

17. The lamp assembly set forth in claim 1 wherein said latch is generally U-shaped in cross-section, said housing having a hook engaging a portion of said latch thereof.

18. An under hood and luggage compartment lamp assembly which is adapted to be positioned on a hood or luggage compartment of a vehicle comprising
   a plastic body having spaced pairs of terminals, one of which is adapted to be connected to a harness and the other of which is adapted to be connected to a lamp,
   a connector extending laterally from said body comprising a first rigid portion and a second portion spaced from the first portion and joined thereto and having a hook portion for engaging the projection with an elongated opening,
   said second portion being flexible such that it can be manually moved toward said first portion to disengage said portion means on said second portion.

19. An under hood and luggage compartment assembly which is adapted to be positioned on a hood or luggage compartment of a vehicle comprising
a plastic body having spaced terminals at one end for connection to a plug of a wiring harness and spaced terminals at the other end for receiving a lamp,
a lens cover of translucent plastic material,
said body and cover having opposed spaced ribs,
said lens having grooves slidingly receiving said ribs,
said lens having an integral latch engaging a portion of said housing for retaining said cover in position.

20. The lamp assembly set forth in claim 19 wherein said latch is generally U-shaped in cross-section, said housing having a hook engaged by a said latch.

* * * * *